US012048996B2

(12) United States Patent
Käsmann et al.

(10) Patent No.: US 12,048,996 B2
(45) Date of Patent: Jul. 30, 2024

(54) DEVICE FOR RECEIVING A HAND-HELD POWER TOOL

(71) Applicant: Hilti Aktiengesellschaft, Schaan (LI)

(72) Inventors: Simon Käsmann, Munich (DE); Michael Lanzinger, Neufraunhofen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/925,945

(22) PCT Filed: May 28, 2021

(86) PCT No.: PCT/EP2021/064369
§ 371 (c)(1),
(2) Date: Nov. 17, 2022

(87) PCT Pub. No.: WO2021/249791
PCT Pub. Date: Dec. 16, 2021

(65) Prior Publication Data

US 2023/0330830 A1 Oct. 19, 2023

(30) Foreign Application Priority Data

Jun. 9, 2020 (EP) .................................... 20178884

(51) Int. Cl.
*B25H 1/00* (2006.01)

(52) U.S. Cl.
CPC .................................. *B25H 1/0028* (2013.01)

(58) Field of Classification Search
CPC .. B25F 5/02; F16B 2/00; F16B 7/0406; B25B 21/00; B25H 1/0028; B25H 1/0078;
(Continued)

(56) References Cited

U.S. PATENT DOCUMENTS

2006/0130279 A1* 6/2006 Sattler ..................... B25F 5/006 16/426
2013/0062498 A1 3/2013 Ito et al.
(Continued)

FOREIGN PATENT DOCUMENTS

DE 19902206 A1 8/2000
DE 102016013145 A 5/2018
(Continued)

OTHER PUBLICATIONS

International Search Report of PCT/EP2021/064369 dated Sep. 14, 2021.

*Primary Examiner* — Jason L Vaughan
*Assistant Examiner* — Amanda Kreiling
(74) *Attorney, Agent, or Firm* — Davidson Kappel LLC

(57) ABSTRACT

A device for receiving a hand-held power tool is provided. The device can serve as an interface between the hand-held power tool and a support or carrying structure and comprises a first and a second fastening means and a counter structure. With the interface it is possible to optimally adapt the suspension of the hand-held power tool to the center of gravity of the hand-held power tool. In addition, the interface can be adapted to different hand-held power tools or types of hand-held power tools by an adjustable distance between the first fastening means and the counter structure or an adjustable diameter of the counter structure. In further aspects, the invention relates to the use of the interface for fastening a hand-held power tool to a support structure, and to a corresponding method.

14 Claims, 8 Drawing Sheets

(58) Field of Classification Search
CPC ................. B25H 3/00; A45F 2003/142; A45F 2200/0575; A45F 3/14; A45F 2003/146; A45F 2005/006; A45F 5/00; A45F 5/021
See application file for complete search history.

(56) References Cited

U.S. PATENT DOCUMENTS

| | | | | |
|---|---|---|---|---|
| 2017/0042314 | A1 | 2/2017 | Helton et al. | |
| 2018/0084895 | A1* | 3/2018 | Moreau .................... | B25H 3/00 |
| 2018/0116378 | A1 | 5/2018 | Schindler et al. | |
| 2019/0134806 | A1 | 5/2019 | Bain et al. | |
| 2021/0023690 | A1 | 1/2021 | Lachica Koch | |

FOREIGN PATENT DOCUMENTS

| | | | |
|---|---|---|---|
| EP | 2439024 | A1 | 4/2012 |
| EP | 3560660 | A1 | 10/2019 |
| JP | 2013059837 | A | 4/2013 |
| WO | WO 2015166904 | A1 | 11/2015 |

* cited by examiner

DEVICE FOR RECEIVING A HAND-HELD POWER TOOL

The present invention relates to a device for receiving a hand-held power tool.

BACKGROUND OF THE INVENTION

Heavy power tools, such as hammer drills, chisel hammers or combination hammers, and core drilling devices, are often used in serial or long-term applications. In order to compensate for the forces that occur, in particular weight forces, the user is exposed to high physical stresses, which can cause rapid fatigue or even physical damage. Therefore, many users endeavor to reduce the physical stress by using support structures in which the hand-held power tools can be suspended or latched. These body-borne and/or external support structures can at least partially absorb the forces that occur and thus enable the user to work for longer with the hand-held power tool. Possible configurations of known support structures are shown in FIG. 1.

SUMMARY OF THE INVENTION

Most power tools, however, do not have any interfaces that can be used to fasten the device to a support structure. Therefore, in the prior art, slings or ropes are mostly used to connect the power tools to the support structure. This procedure is associated with the disadvantage that the slings or ropes in some hand-held power tools can inadvertently activate switches or that the slings or ropes can get caught in the moving insertion tools of the hand-held power tools. Obviously, this can impair work with the hand-held power tool or pose a risk to the user.

Another disadvantage of a conventional suspension by means of ropes or slings is that the hand-held power tool cannot be suspended exactly in its center of gravity using ropes or slings. This can disadvantageously make handling of the hand-held power tool difficult and the quality of work can be impaired.

For example, in DE 10 2016 013 145 A, a receiving clip for a work device, such as a brushcutter, is disclosed. The receiving clip is designed to be flexurally elastic in a manner running transversely with respect to a slot such that the slot can be widened. In the context of DE 10 2016 013 145 A, elastic properties of a receiving clip are thus used to connect the clip to a work device.

A disadvantage of the suspension solutions known from the prior art for hand-held power tools is that the elastic properties of materials, ropes or receiving clips are often used to produce a connection between a hand-held power tool and a support structure. However, such connections based on the elasticity of a material are hardly suitable for use in connection with hammering and/or rotating hand-held power tools, since they absorb the vibrations that can occur when working with the hand-held power tools and can, for example, resonate. The absorption of the vibrations can also lead to a weakening of the connection between the hand-held power tool and the support structure, which in the worst case can lead to the connection being broken. In light of the known prior art, it would be desirable to have a fastening solution for a hand-held power tool on a support structure that is user-friendly and less susceptible to the vibrations that occur when working with the hand-held power tools. Furthermore, the technical solution to be provided should enable optimal balancing of the hand-held power tool in relation to the support structure in order to further facilitate working with the hand-held power tool. In addition, it would be desirable if the technical solution to be provided could be used as universally as possible for a large number of different hand-held power tools or types of hand-held power tools.

It is an object of the present invention to provide solutions for the technical requirements described above and to provide a fastening solution for connecting a hand-held power tool to a support structure which overcomes the deficiencies and disadvantages of the prior art.

The present disclosure provides a device for receiving a hand-held power tool, wherein the hand-held power tool has a first handle and a second handle and the first handle is fastenable with a tightening strap to the hand-held power tool. The device can also be referred to as an interface within the meaning of the invention and is characterized in that it comprises the following components:

- a first fastening means which is designed to enter into engagement with the tightening strap and to form a first contact region between the hand-held power tool and the device,
- a second fastening means with which the device is fastenable to a support structure, wherein the second fastening means is designed to be movable,
- a counter structure which is designed to form a second contact region between the hand-held power tool and the device.

The invention is advantageously a particularly universally usable receiving device for handling various hand-held power tools, such as hammer drills, combination hammers or chisel hammers, and for example core drilling devices. The devices that are to be connected to a support structure in the context of the present invention are preferably hand-held power tools that each have a first and a second handle. It is preferred in the context of the invention that the first handle of the power tool can preferably also be referred to as the front handle or side handle of the power tool. If the user working with the hand-held power tool is a right-handed person, the first handle of the hand-held power tool is usually held in the users left hand. The first handle can be fastened to the hand-held power tool with a tightening strap; it is preferably arranged on a front region of the hand-held power tool. The second handle can be C-shaped or D-shaped, for example, and is usually held in the right hand of a right-handed person. The second handle is preferably located in a rear region of the hand-held power tool. The hand-held power tool can furthermore have a housing which surrounds the internal components of the hand-held power tool in a manner known to a person skilled in the art and shapes the external form of the hand-held power tool. In particular, the exterior of the hand-held power tool can be shaped by its device neck. In the context of the invention, this means that the hand-held power tool can have differently sized diameters in the region of the first handle. A particular advantage of the present invention is that the interface is suitable for use with hand-held power tools with different diameters or housing shapes. This advantage is brought about in particular by the provision of the counter structure, which can be designed either as a receiving device for a rear region of the hand-held power tool or as a retaining ring that can be exchanged or is designed to be adjustable in size. The retaining ring is preferably located in a front region of the interface and in particular in spatial proximity to the first fastening means. When using an exchangeable retaining ring as the counter structure, different retaining rings can be used, the diameter of which in each case corresponds to the diameter of the neck of the hand-held power tool. If a size-adjustable retaining ring is used as the counter structure, the size or the diameter of the retaining ring can be adapted to the diameter of the device neck. To this end, an adjustment means can in particular be provided.

The counter structure is designed in particular to form a second contact region between the hand-held power tool and the device. The term “contact region” preferably means in the context of the invention that the hand-held power tool and the interface are in contact with one another in these regions, i. e. touch one another, the contact regions being arranged in particular on an underside of the interface. This underside of the interface can in particular face an upper side of the hand-held power tool. It has been found to be particularly expedient for the system comprising the hand-held power tool and the device to have at least two contact regions. A first contact region between the hand-held power tool and the interface is preferably formed by the first fastening means, while a second contact region between the hand-held power tool and the interface is formed by the counter structure. It is preferred in the context of the invention that the first contact region is present in a front region of the interface, while the second contact region can also be present in a front region of the interface if the counter structure is designed as a retaining ring. If the counter structure is designed as a receiving region, it is preferred in the context of the invention that the second contact region is present in a rear region of the interface. The use of a receiving region as a counter structure advantageously makes it possible to ensure a large distance between the first and second contact regions. This preferably enables particularly stable mounting and holding of the hand-held power tool within the interface. The advantage of using the retaining ring resides, in particular, in the great flexibility of the counter structure created in this way.

The interface is designed to receive a hand-held power tool. In this respect, it can also be referred to as a receiving device. The device can also be used to connect the hand-held power tool to a support structure. In this context it functions as an interface or adapter. With the interface it is possible to optimally adapt the suspension of the hand-held power tool to the center of gravity of the hand-held power tool. In other words, the hand-held power tool can be balanced particularly well by means of the invention. This is advantageously made possible in that the interface comprises a second fastening means that is designed to be movable or displaceable with respect to a longitudinal axis of the device. In other words, the second fastening means can be moved along an axis running centrally through the interface. For this purpose, the interface comprises a grid with different receiving recesses for the second fastening means. The second fastening means can be moved over the grid and, depending on the center of gravity of the hand-held power tool, can snap into one of the recesses and can be fastened. As a result, the second fastening means not only allows a hand-held power tool to be connected to a support structure, but also allows the attachment or suspension of the hand-held power tool to be adapted in relation to the support structure. The second fastening means is constructed in a particularly simple manner and therefore requires little maintenance. In addition, the handling of the second fastening means for adapting the suspension of the hand-held power tool depending on its center of gravity is particularly intuitive and easy to learn. In this respect, the provision and configuration of the second fastening means provides a particularly user-friendly option for balancing the hand-held power tool when the hand-held power tool is to be fastened to a support or carrying structure.

Another advantage of the invention is that the interface enables a mechanical connection between the interface, the hand-held power tool and the support structure. In particular, this overcomes the disadvantage that elastic properties of materials or the like are used to connect the components of a work system that includes an interface, a hand-held power tool and a support structure to one another. Rather, in the context of the present invention, a connection of the system components is provided in which mechanical methods, such as bracing, jamming, wedging or clamping, are used to connect the interface, the hand-held power tool and the support structure to one another particularly safely, stably and insensitively to vibrations.

In addition, the interface can be adapted to different hand-held power tools or types of hand-held power tools by an adjustable distance between the first fastening means and the counter structure or by an adjustable diameter of the counter structure. The interface can therefore be used particularly universally and can be used for a large number of different devices and product classes. This leads to cost savings for the user, since the user needs only one interface as an adapter for suspending various hand-held power tools on a support structure. The distance between the first fastening means and the counter structure designed as a receiving region can in particular be adjusted by an adjustment means, wherein the adjustment means is preferably arranged in a front region of the interface. In the context of the invention, said adjustment means can preferably be referred to as the first adjustment means and can bear the reference sign 13*a*. It can preferably be designed as a knurled screw. By actuating the adjustment means, the distance between the first fastening means and the receiving region can be changed, and therefore the distance can be optimally adjusted for larger and smaller hand-held power tools. By optimally adjusting the distance between the first fastening means and the receiving region, the hand-held power tool with the interface can be braced safely and robustly against shocks or vibrations. If the adjustment means is designed as a knurled screw, the distance between the first fastening means and the receiving region can be adjusted by turning the knurled screw. The distance can preferably be adjusted continuously, such that a particularly precise adaptation of the distance to the respective hand-held power tool to be fastened or braced can be achieved.

In a preferred embodiment, the invention relates to a device for receiving a hand-held power tool, wherein the hand-held power tool has a first handle and a second handle and the first handle is fastenable with a tightening strap to the hand-held power tool, wherein the device comprises the following components:

a first fastening means which is designed to enter into engagement with the tightening strap and to form a first contact region with the hand-held power tool, a second fastening means with which the device is fastenable to a support structure, wherein the second fastening means is designed to be displaceable, a receiving region as a counter structure in order to receive part of the hand-held power tool, and an adjustment means to adjust a distance between the first fastening means and the receiving region.

If the counter structure is designed as a retaining ring, the interface can comprise an adjustment means, which in the context of the invention is preferably referred to as a second adjustment means and which bears the reference sign 13*b*. The retaining ring can have a slot or be slotted. The size of the slot and thus the diameter of the retaining ring can be adjusted with the second adjustment means and, in particular, adapted to the diameter of a hand-held power tool that is to be received by the receiving device. In particular, the diameter of the counter structure designed as a retaining ring can be adapted to the diameter of a neck of the hand-held power tool by the second adjustment means. As an alternative to the size-adjustable retaining ring, a kit with a plurality of retaining rings can be provided, the retaining rings each having different diameters. For each hand-held power tool that is to be received by the receiving device, such a retaining ring can then be used as a counter structure, the diameter of which corresponds to the diameter of the device neck of the desired hand-held power tool. In this case, the interface manages without adjustment means.

In this preferred embodiment, the invention relates to a device for receiving a hand-held power tool, wherein the device comprises the following components:

- a first fastening means which is designed to enter into engagement with the tightening strap and to form a first contact region with the hand-held power tool,
- a second fastening means with which the device is fastenable to a support structure, wherein the second fastening means is designed to be displaceable,
- a retaining ring as a counter structure, wherein the retaining ring is designed to form a second contact region between the hand-held power tool and the device, and
- optionally, an adjustment means to adjust a diameter of the retaining ring if the retaining ring is designed to be adjustable in size.

Otherwise, a kit with a plurality of retaining rings can be provided, the individual retaining rings of the kit having different diameters.

The first fastening means is designed to enter into engagement with a tightening strap of the hand-held power tool and thus to connect the interface to a front region of the hand-held power tool. In particular, the first fastening means forms a first contact region with the hand-held power tool. The tightening strap is used to fasten a lateral handle, which is referred to as the first handle of the hand-held power tool in the context of the invention, to the hand-held power tool. In particular, the first handle of the hand-held power tool is located in a front region of the hand-held power tool. The first fastening means can be designed as a hook or can be hook-shaped, for example, so that it can be guided or pushed between the tightening strap and the hand-held power tool. In combination with the variable distance between the first fastening means and the receiving region or with the size-adjustable or exchangeable retaining ring as a counter structure, a stable connection can be provided between the hand-held power tool and the interface. Tests have shown that this connection is particularly stable against shocks or vibrations and is therefore particularly well suited for use on construction sites.

In a preferred refinement of the invention, the receiving region of the interface is designed to receive at least part of the hand-held power tool, such that a connection is created between the interface and the rear region of the hand-held power tool or its housing. In the context of the invention, the receiving region can preferably also be referred to as a handle receptacle, because the receiving region can be particularly suitable for receiving the second handle or a part of the housing of the hand-held power tool that is arranged in the region of the second handle of the hand-held power tool. The second handle is located in the rear region of the hand-held power tool and is usually held by the right hand of a right-handed user. The hand-held power tool can comprise a housing, wherein the receiving region of the interface preferably comprises a cavity into which a part of the housing of the hand-held power tool can be inserted. This introduction or pushing in can be achieved, for example, by the adjustment means or the shortening of the distance between the receiving region and the first fastening means. In other words, the hand-held power tool can be pushed into the receiving region by actuating the adjustment means. As a result, the distance between the receiving region and the first fastening means is shortened and the hand-held power tool is braced or wedged within the interface. This bracing leads to a particularly stable, mechanical connection between the interface and the hand-held power tool.

The device can be used to connect a hand-held power tool to a support structure. Such body-borne or external support structures usually absorb the forces or vibrations that occur when working with a hand-held power tool and support or facilitate the work of a user. Various conventional support structures, as they are known from the prior art, are shown in FIG. 1. For example, they can be fastened to a user with a torso belt or a harness and/or constructed in the manner of gallows. Bow-like constructions that are guided over the users shoulder are also known in the prior art, as well as free-standing and stand-alone constructions. It is not the object of the present invention to specify a specific configuration of the support structure. Rather, the present invention relates to an interface as an adapter between a hand-held power tool and a support structure. However, in the context of the present invention, a system is also disclosed that comprises a hand-held power tool, an interface and a support structure, wherein the interface is designed to connect the hand-held power tool to the support structure.

It is preferred in the context of the invention that the first fastening means is designed as a hook, wherein the hook is designed to be pushed under the tightening strap of the hand-held power tool. The use of the existing tightening strap with which a first handle is fastened to the hand-held power tool leads to synergistic effects and, surprisingly, also to a particularly stable mechanical connection between the first fastening means and the hand-held power tool. The tightening strap is preferably stretched tightly around a front part of the hand-held power tool. The first fastening means forms a first contact region between the hand-held power tool and the interface. Tests have shown that the first fastening means can nevertheless be pushed under the tightening strap without great effort in order to achieve a fastening effect. The hook, which can be used as the first fastening means, is fastened in a front part of the interface. It is preferably in spatial proximity to the adjustment means and is located on the underside of the interface, which preferably faces the hand-held power tool when the interface is connected to the hand-held power tool. The hook preferably has a flat underside which is designed to be pushed under the tightening strap. This flat underside of the hook is preferably formed substantially parallel to a preferably flat region of the upper side of the hand-held power tool, such that the hook, tightening strap and hand-held power tool can readily enter into engagement with one another in order to produce a stable connection between the components.

In a further embodiment of the invention, it is preferred that the second fastening means is designed as a retaining eyelet, wherein the retaining eyelet is displaceable axially along a virtual central axis running through the interface by means of a grid. In other words, the second fastening means is designed to be movable, in particular displaceable, with respect to the interface. It can preferably be displaced via a grid of the interface. Owing to the displaceability of the second fastening means, its position in relation to the hand-held power tool can be adapted to the center of gravity of the hand-held power tool. For example, the second fastening means can be snapped into the grid directly above the center of gravity of the hand-held power tool. By choosing a position of the second fastening means that is adapted to the center of gravity, the hand-held power tool can be optimally balanced, as a result of which working with the hand-held power tool can be made considerably easier for the user. In the context of the invention, it is particularly preferred that the second fastening means is designed to be movable along a central axis of the interface so that the position of the second fastening means can be adapted to a center of gravity of the hand-held power tool.

The second fastening means is provided in particular for fastening the hand-held power tool or the interface to the support structure. A rope or another fastening component, for example, which can be connected to the support structure, can be guided through the retaining eyelet. Of course, the second fastening means can also be designed differently than as a retaining eyelet, as long as it is suitable for connecting the interface to a support structure. The second fastening means is preferably moved along an axis which runs centrally through the interface. In the context of the invention, the central axis is preferably also referred to as the longitudinal axis of the interface. The position of this central axis is shown in FIGS. 4 and 5. The second fastening means is preferably movably arranged between the front and rear regions of the interface. In the attached figures, the second fastening means is located substantially in each case in the middle between the front and rear regions of the interface.

It is preferred in the context of the invention that the interface has a front region and a rear region, wherein the first fastening means and the optional adjustment means are arranged in the front region of the interface. If the counter structure is designed as a receiving region, it is preferably arranged in the rear region of the interface, while the counter structure is present in a front region of the interface if it is designed as a retaining ring. The front region of the hand-held power tool is preferably that part of the device on which the tool fitting, a first handle and the tightening strap fastening the first handle are located. The hand-held power tool extends over a housing as far as a final rear region in which, for example, the second handle of the hand-held power tool is arranged. The front part of the hand-held power tool and the front part of the interface, as well as the rear part of the hand-held power tool and the rear part of the interface, preferably correspond to one another. In the context of the invention, the term "correspond to one another" preferably means that these regions are in spatial proximity to one another when the hand-held power tool is connected to the interface.

Even if individual features of the interface are specified in relation to features of a hand-held power tool, this does not result in any ambiguity for a person skilled in the art. Rather, the reference clarifies the type of hand-held power tool for which the interface can be used, namely preferably those hand-held power tools that have a first and a second handle, wherein the first handle can be designed as a side handle and can be fastened to the hand-held power tool with a tightening strap. In this respect, the reference substantiates the features of the interface and explains to a person skilled in the art about possible uses of the invention.

In a further embodiment of the invention, it is preferred that the adjustment means is designed as a knurled screw. A person skilled in the art knows what a knurled screw is. The knurled screw is used in the context of the present invention to adjust a distance between the first fastening means and the receiving region. The knurled screw can alternatively be used to adjust a diameter of the retaining ring if the counter structure of the interface is designed as a size-adjustable retaining ring. This advantageously makes it possible for the interface to be used for many different hand-held power tools or types of hand-held power tools.

In other words, the interface is preferably characterized in that it comprises the following components and functions:

a hook which is designed to enter into engagement with the tightening strap and to connect the interface to a front region of the hand-held power tool, the hook forming a first contact region between the hand-held power tool and the interface, a retaining eyelet with which the interface can be fastened to a support structure, wherein the second fastening means is designed to be displaceable in order to adapt the position of the retaining eyelet in relation to the hand-held power tool to a center of gravity of the hand-held power tool, a counter structure that forms a second contact region between the hand-held power tool and the interface.

The interface can also have a knurled screw in order to adjust a distance between the hook and the counter structure, and therefore the interface can advantageously be used for various hand-held power tools. The counter structure can preferably be designed as a receiving region in order to receive part of the housing of the hand-held power tool and to connect the interface to a rear region of the hand-held power tool. The counter structure can alternatively be designed as an exchangeable or size-adjustable retaining ring. In the context of the invention, it is preferred that the retaining ring is arranged in a front region of the interface, preferably in spatial proximity to the first fastening means. In this refinement of the invention, the adjustment means can be used to adjust a diameter of the retaining ring and thus to adapt it to the dimensions of the hand-held power tool that is to be connected to a support structure.

In one exemplary embodiment, the invention represents an interface between a hand-held power tool and a support structure or device. The hand-held power tool can be a hammer drill, a chisel hammer or a combination hammer, or a hand-operated core drilling device. However, various other types of hand-held power tools are also conceivable. To fasten the hand-held power tool, the first fastening means of the interface, which can be designed as a front hook, for example, is jammed under the tightening strap of the side handle of the hand-held power tool. Tightening straps can preferably be used to attach handles or side handles to hand-held power tools or to fasten same thereto. Actuation of the adjustment means can shorten a distance between the hook and the handle receptacle or can adjust a diameter of the retaining ring, as a result of which the tool is braced in the receiving device. The adjustment means can be actuated in particular by turning the knurled screw, which can be used as an adjustment means. This adjustability of the distance between the first fastening means and the receiving region or the adjustability of the diameter of the counter structure means that the interface can advantageously be used for different devices with different housing sizes. Since the various devices can have very different centers of gravity, the retaining eyelet, which preferably forms the second fastening means, can be displaced in the axial direction using a grid. This functionality of the invention is particularly user-friendly, since the center of gravity of the hand-held power tool can change considerably, for example when using different tools, such as drills, chisels or drill bits. The movable second fastening means allows the user easily and without great effort to adapt the position of the retaining eyelet to the possibly changed center of gravity of the hand-held power tool when changing the tool of the hand-held power tool and thus continue to work comfortably without losing much time. In particular, the hand-held power tool can be easily balanced at any time by the displaceable second fastening means, as a result of which the handling of the hand-held power tool is further significantly facilitated by the invention.

In a second aspect, the invention relates to a use of the interface for fastening a hand-held power tool to a support structure. The use is characterized in that the interface has a second fastening means with which the interface can be fastened to a support structure. The interface can preferably have, in particular, a retaining eyelet in order to fasten the interface to the support structure.

In a further aspect, the invention relates to a method for fastening a hand-held power tool to a support structure. The method is characterized by the following steps:

a) providing a support structure and a hand-held power tool,
b) providing an interface,
c) connecting the hand-held power tool to the support structure using a second fastening means of the interface.

The terms, definitions and technical advantages introduced for the interface preferably apply analogously to their use and the method.

BRIEF DESCRIPTION OF THE DRAWINGS

Further advantages of the invention will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

In the figures, identical and similar components are denoted by the same reference signs. In the figures.

DETAILED DESCRIPTION

Figure 1:
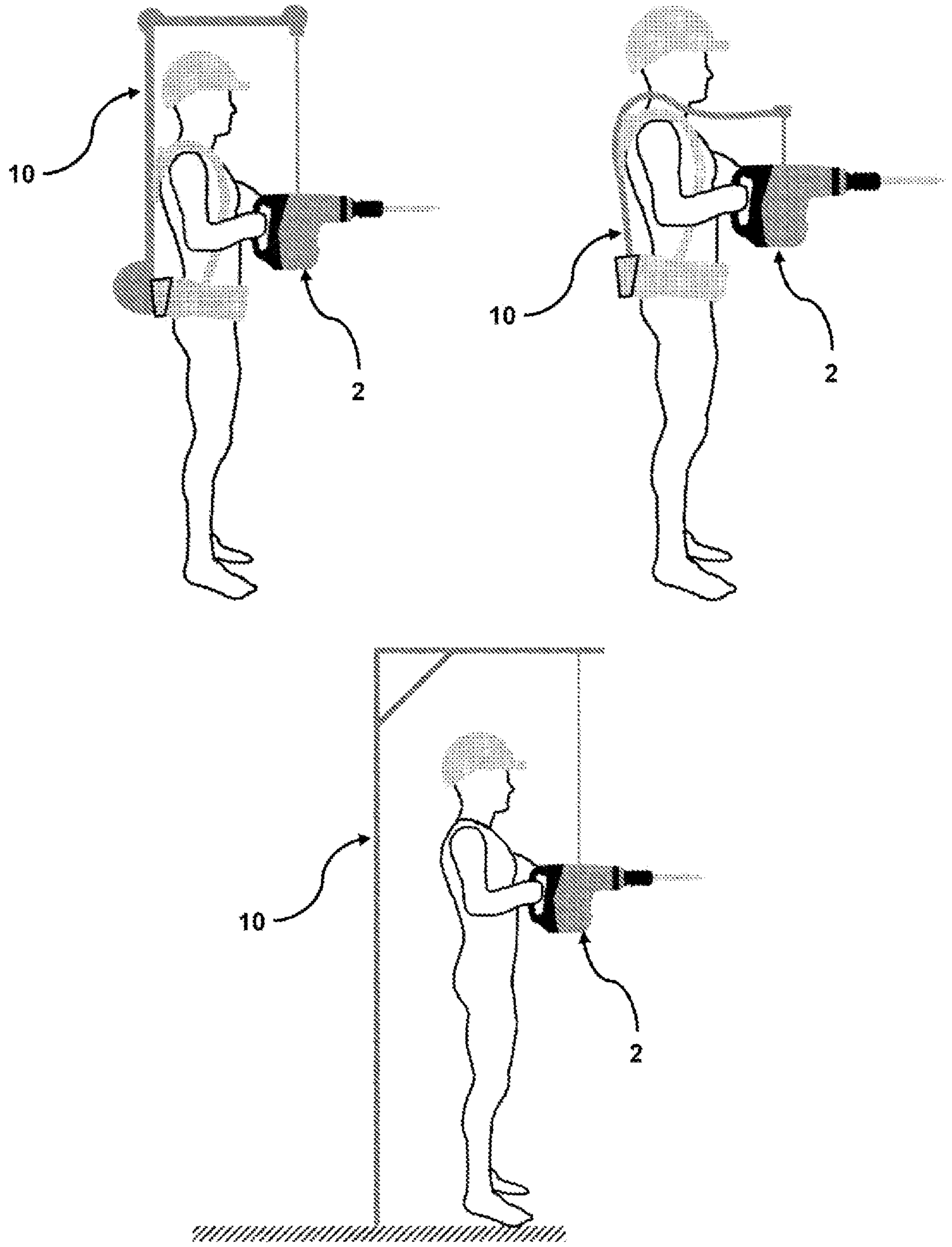
FIG. 1 shows views of various support structures.

FIG. 1 shows views of various support structures (10) as they are known from the prior art. The support structures (10) can be connected to hand-held power tools (2), although scarcely any technically satisfactory solutions have been known previously to ensure a stable, secure and robust connection between the support structure (10) and the hand-held power tool (2). Such a technical solution, which is also easy to use, allows the position of the hand-held power tool (2) to be adapted in relation to the support structure (10) to the center of gravity of the hand-held power tool (2) and universally, i.e. can be used for a particularly large number of different hand-held power tools (2) or types of hand-held power tools (2), is provided with the present invention. This invention is illustrated in FIGS. 2 to 5.

Figure 2:
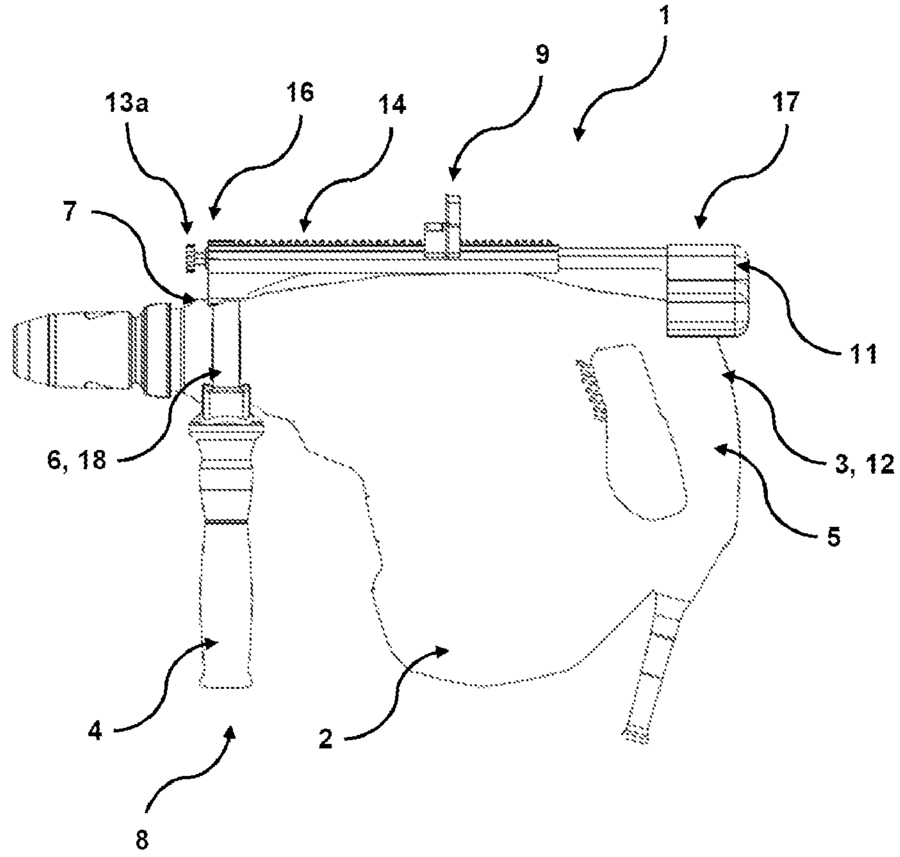
FIG. 2 shows a side view of an exemplary hand-held power tool that is connected to a preferred embodiment of an interface.

FIGS. 2 to 5 show a first refinement of the invention, in which a counter structure (11) is designed as a receiving region and is present in the rear region (17) of the interface (1). In particular, FIG. 2 shows a side view of an exemplary hand-held power tool (2) which is connected to a preferred embodiment of the interface (1) ("connected state"). The hand-held power tool (2) can be a battery-operated device or a device with a mains connection. In the exemplary embodiment of the invention shown in FIG. 2, the interface (1) is located on an upper side of the hand-held power tool (2). The hand-held power tool (2) has a housing (3), a first handle (4) and a second handle (5), wherein the first handle (4) is located in a front region (8) of the hand-held power tool (2) and is fastened with a tightening strap (6) to the hand-held power tool (2). In particular, the tightening strap (6) can be arranged circumferentially around the front region (8) of the hand-held power tool (2), with it usually being braced fixedly or tightly. The first fastening means (7) of the interface (1) can be pushed between the tightening strap (6) and the hand-held power tool (2). The first fastening means (7) can in particular be designed as a hook, such that a flat underside of the first fastening means (7) rests on a preferably flat section of the upper side of the hand-held power tool (2). This produces a connection between the first fastening means (7) of the interface (1) and the hand-held power tool (2).

The adjustment means (13*a*), which can be designed as a knurled screw, is also located in the front region (16) of the interface (1). With said adjustment means/knurled screw, a distance between the first fastening means (7) and a receiving region of the interface (1) can be changed, wherein the receiving region can represent a counter structure (11) within the meaning of the invention. The receiving region is preferably located in a rear region (17) of the interface (1). If the interface (1) is to be connected to a hand-held power tool (2), the distance between the first fastening means (7) and the receiving region can be shortened with the adjustment means (13*a*) such that the hand-held power tool (2) is jammed or clamped in the interface (1). The receiving region of the interface (1) can, for example, be at least partially hollow or can have a cavity, wherein the receiving region in this cavity can receive part of the power tool (2) or of the housing (3) of the hand-held power tool (2). By receiving part of the hand-held power tool (2) in the receiving region or a cavity in the receiving region, a particularly stable, mechanical connection between the interface (1) and the hand-held power tool (2) can be made possible.

The second handle (5) of the hand-held power tool (2) is preferably located in a rear region (12) of the hand-held power tool (2). On an upper side of the interface (1) there is a grid (14) by means of which the second fastening means (9) of the interface (1) can be displaced along a central axis (15) of the interface (1). Due to the movable configuration of the second fastening means (9), the position thereof can be adapted to a center of gravity of the hand-held power tool (2). This function is particularly advantageous when the center of gravity of a hand-held power tool (2) changes, for example, when the tool, such as a drill, chisel or drill bit, of the hand-held power tool (2) is changed.

Figure 3:
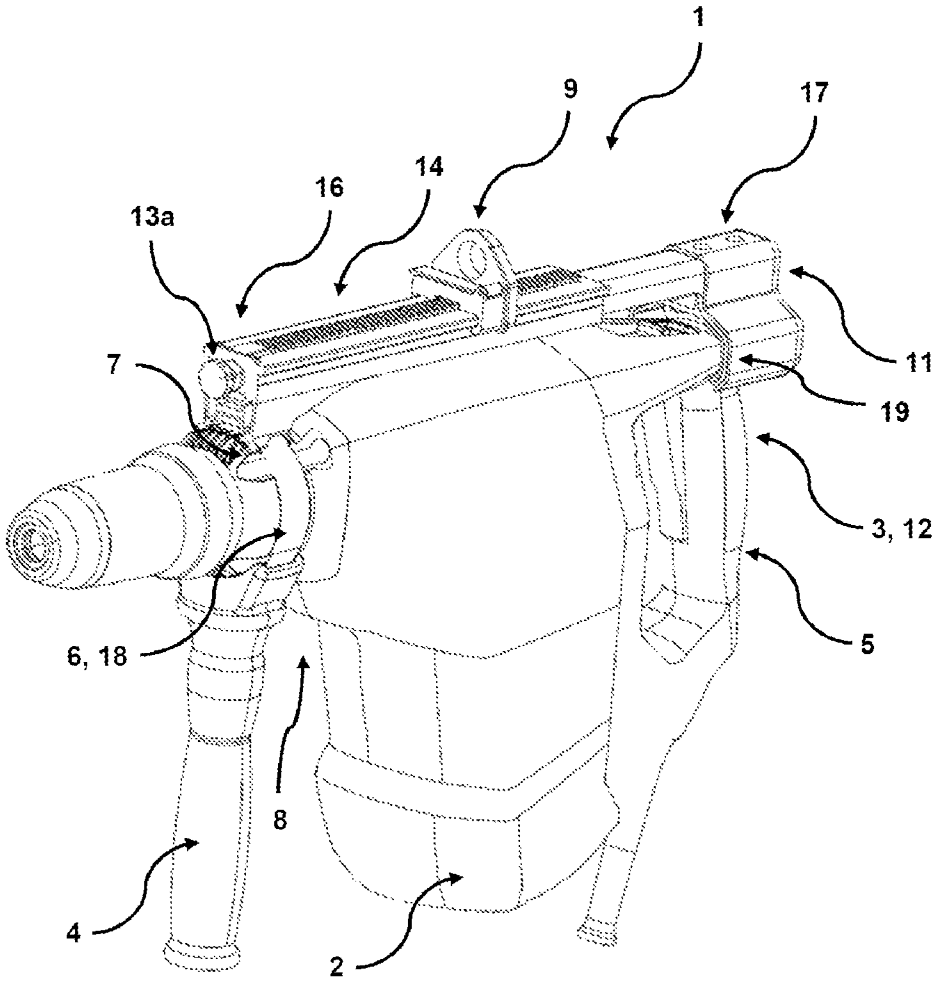
FIG. 3 shows an oblique front view of an exemplary hand-held power tool that is connected to a preferred embodiment of the interface.

FIG. 3 shows an oblique front view of an exemplary hand-held power tool (2) which is connected to the first preferred embodiment of the interface (1). In particular, the contact regions (18, 19) are shown in FIG. 3. In the embodiment of the invention shown in FIG. 3, the first contact region (18) is in the region of the tightening strap (6) of the hand-held power tool (2) or of the first fastening means (7) of the interface (1), while the second contact region (19) is in the region of the basic structure (11) that is designed as a receiving region. In the contact regions (18, 19) there is preferably in each case contact between the interface (1) and the hand-held power tool (2), i. e. in these regions (18, 19) the interface (1) and the hand-held power tool (2) are in contact with each other. The first contact region (18) is preferably formed by the first fastening means (7), which is preferably designed as a hook, and the tightening strap (6) or the hand-held power tool (2), while the second contact region (19) is formed by the receiving region and the rear region (12) of the housing of the hand-held power tool (2).

Figure 4:
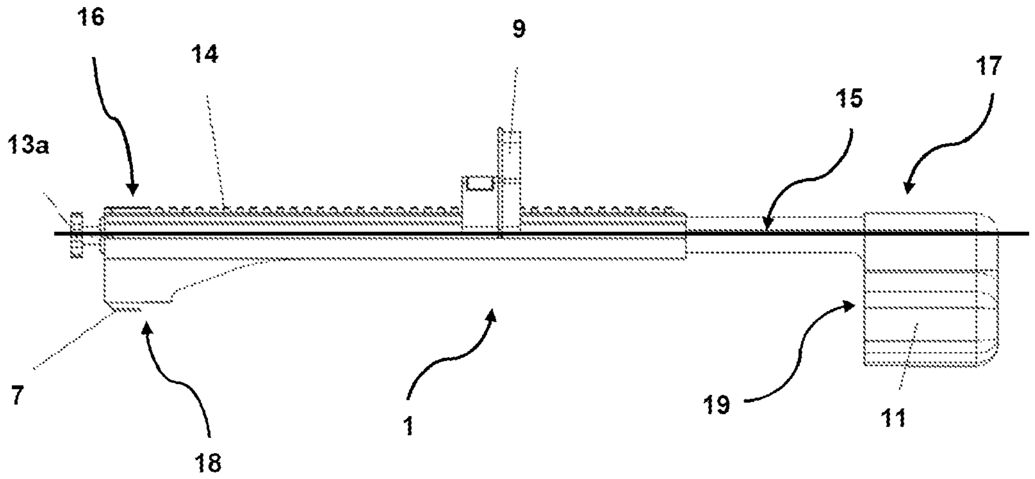
FIG. 4 shows a side view of a preferred embodiment of the interface.

FIG. 4 shows a side view of the first preferred embodiment of the interface (1), wherein the interface (1) is not connected to a hand-held power tool (2) in the view shown in FIG. 4 ("disconnected state"). The left half of the image shows the front region (16) of the interface (1) and the right half of the image shows the rear region (17) of the interface (1). The adjustment means (13*a*) and the first fastening means (7) are located in the front region (16) of the interface (1). In a particularly preferred exemplary embodiment of the invention, these can be formed by a knurled screw (13) and a hook (7). The hook (7) is designed to enter into engagement with a tightening strap (6) of the hand-held power tool (2). The hook (7) in particular forms a first contact region (18) with the hand-held power tool (2). The adjustment means (13*a*) can be used to adjust a distance between the first fastening means (7) and the receiving region of the interface (1), the receiving region being located in the rear region (17) of the interface (1). In the first preferred refinement of the invention, the receiving region forms the counter structure (11) and is preferably designed to receive part of the hand-held power tool (2) or to produce a connection between the interface (1) and the rear region (12) of the hand-held power tool (2). The receiving region can preferably also be referred to as a "handle receptacle".

In the upper region of the interface (1) there is a grid (14) which enables the second fastening means (9) to move axially along a central axis (15) of the interface (1). The central axis (15) preferably runs substantially parallel to the grid (14) of the interface (1). Owing to the movable configuration of the second fastening means (9), which can in particular be designed as a retaining eyelet, the position of the second fastening means (9) can be adapted to the center of gravity of the hand-held power tool (2). The second fastening means (9) is provided in particular to connect the hand-held power tool (2) to a support structure (10) (see e.g., FIG. 1).

Figure 5:
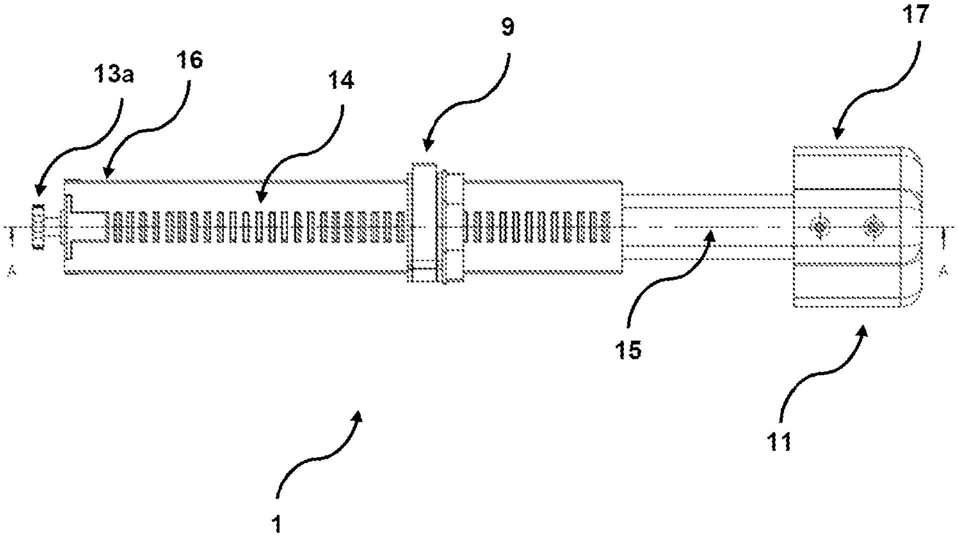
FIG. 5 shows a plan view of a preferred embodiment of the interface.

FIG. 5 shows a plan view of the first preferred embodiment of the interface (1). In the plan view of the interface (1) shown in FIG. 5, in particular the position and the course of the central axis (15) of the interface (1) can be clearly seen.

Figure 6:
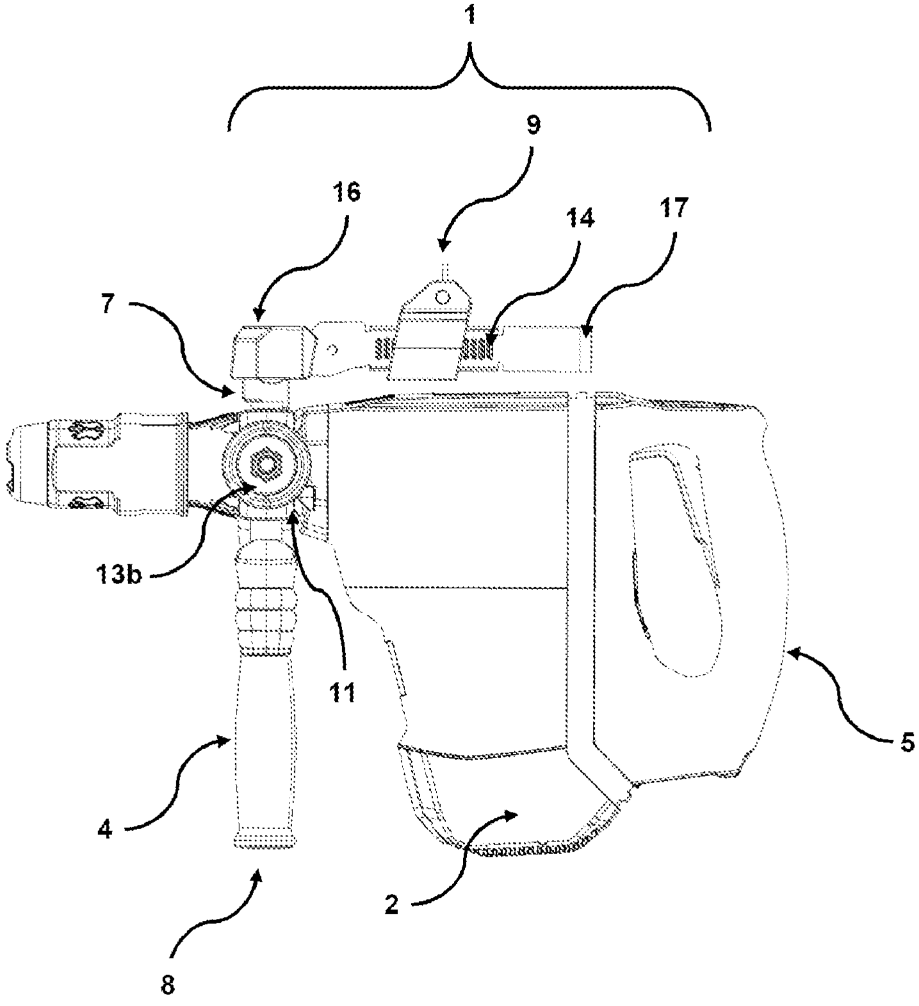
FIG. 6 shows a side view of a second preferred embodiment of the interface.
Figure 7:
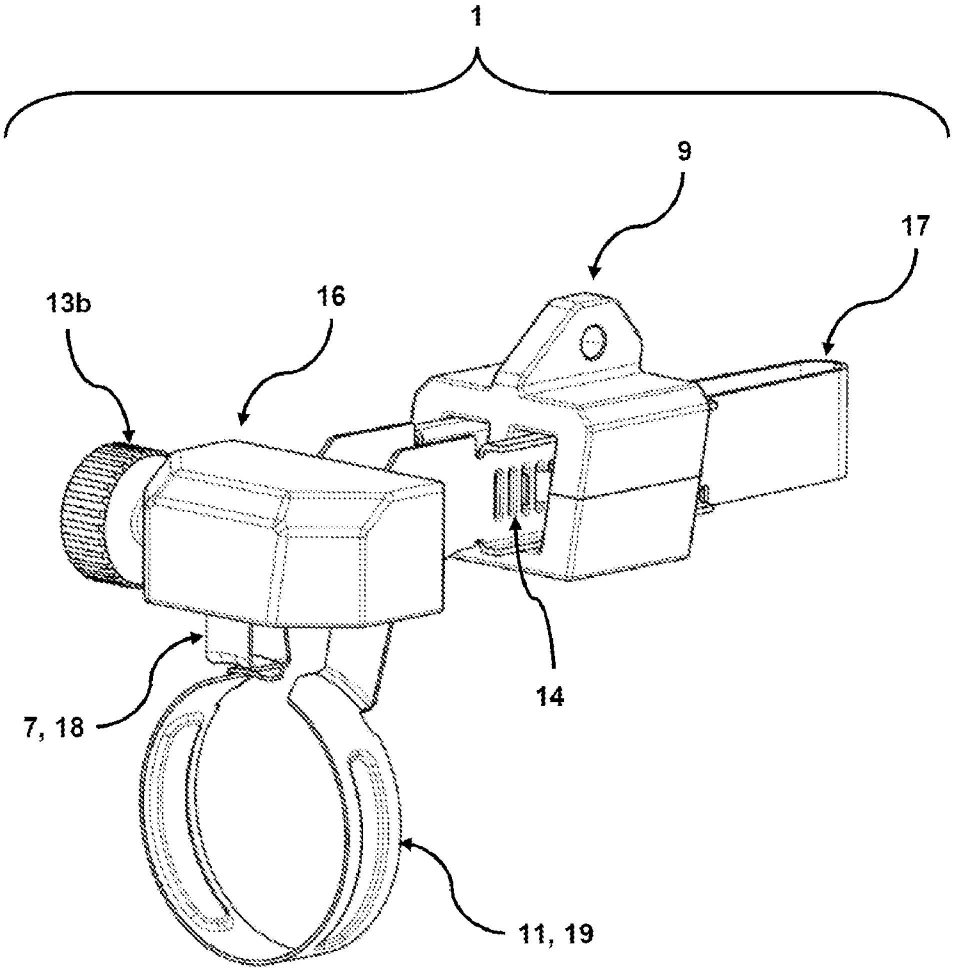
FIG. 7 shows an oblique view of the second preferred embodiment of the interface.
Figure 8:
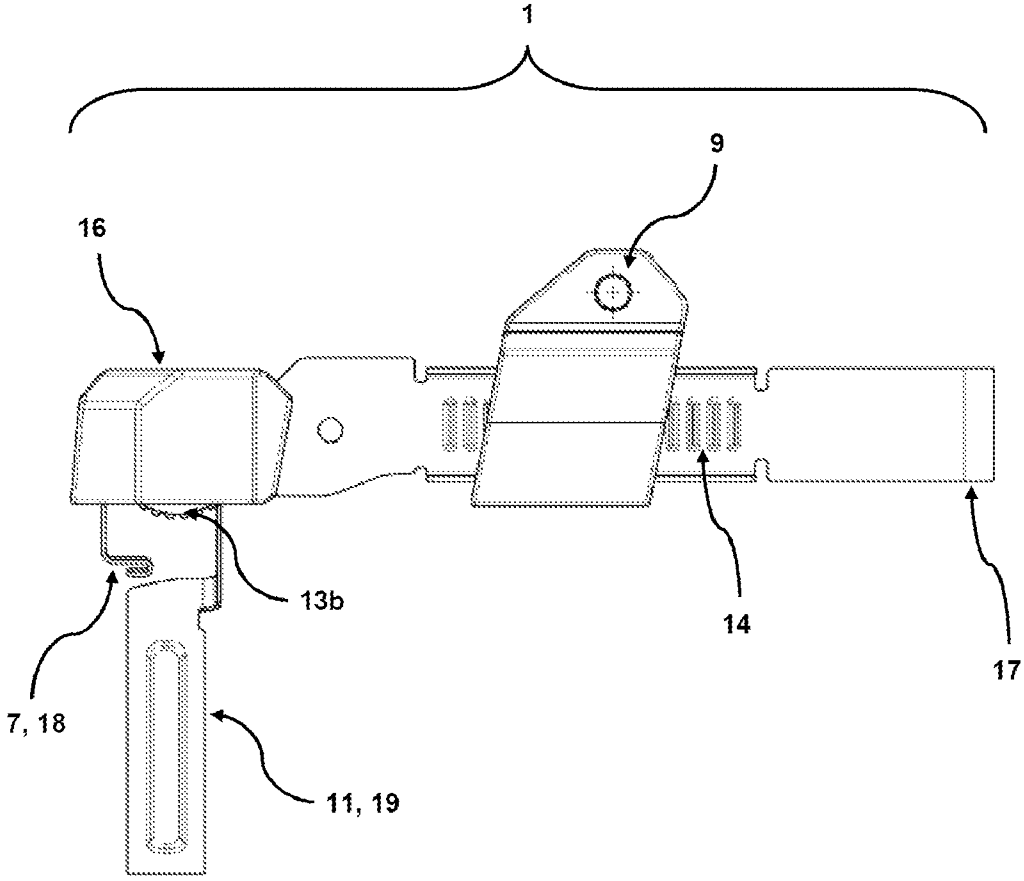
FIG. 8 shows a side view of the second preferred embodiment of the interface.

FIGS. 6 to 8 show a second refinement of the invention, in which a counter structure (11) is designed as a retaining ring and is present in the front region (16) of the interface (1). The retaining ring can be placed around the device neck of a hand-held power tool (2) and adapted to the size or the circumference of the hand-held power tool neck using an adjustment means (13*b*). The first fastening means (7), which is preferably designed as a hook, forms a first contact region (18) and is in spatial proximity to the counter structure (11) which is designed as a retaining ring.

FIG. 7 shows an oblique front view of the second preferred refinement of the interface (1). The counter structure (11), which forms the second contact region (19) with the hand-held power tool (2, not shown), is arranged in the front region (16) of the interface (1). The contact is formed in particular by placing the retaining ring around the neck of the hand-held power tool (2). The retaining ring has a slot in its upper region, wherein the size of said slot-shaped opening can be adjusted. This is preferably done with the adjustment means (13*b*), which can in particular be designed as a knurled screw. It is preferred in the context of the invention that the adjustment means (13*b*) is designed to adjust a diameter of the basic structure (11) designed as a retaining ring, as a result of which the basic structure (11) or the device (1) can be adapted particularly flexibly to different hand-held power tools (2) or to the dimensions thereof.

The two contact regions (18, 19) are preferably used to provide the system comprising the hand-held power tool (2) and the interface (1) with stability. In particular, the provision of two contact regions (18, 19) enables the hand-held power tool (2) to be suspended in the device (1) with little vibration. The retaining ring of the basic structure (11) advantageously encloses the neck of the hand-held power tool (2) such that a particularly stable connection between the hand-held power tool (2) and the device (1) can be achieved in this way.

FIG. 8 shows a side view of the second preferred refinement of the interface (1). The first fastening means (7) and the basic structure (11) can be clearly seen in the front region (16) of the interface (1), wherein the first fastening means (7), which is preferably designed as a hook, forms a first contact region (18) between the hand-held power tool (2) and the device (1), while the basic structure (11), which is preferably designed as a retaining ring, forms a second contact region (19) between the hand-held power tool (2) and the device (1).

LIST OF REFERENCE SIGNS

1 Device or interface
2 Hand-held power tool
3 Housing of the hand-held power tool
4 First handle of the hand-held power tool
5 Second handle of the hand-held power tool
6 Tightening strap of the hand-held power tool
7 First fastening means
8 Front region of the hand-held power tool
9 Second fastening means
10 Support structure
11 Receiving region
12 Rear region of the hand-held power tool
13 Adjustment means
14 Grid
15 Virtual central axis through the hand-held power tool
16 Front region of the interface
17 Rear region of the interface
18 First contact region
19 Second contact region

What is claimed is:

1. A device for receiving a hand-held power tool, the hand-held power tool having a first handle and a second handle and the first handle being fastenable with a tightening strap to the hand-held power tool, the device comprising:

a first fastener designed to enter into engagement with the tightening strap and to form a first contact region between the hand-held power tool and the device;

a second fastener, the device being fastenable with the second fastener to a support structure, the second fastener designed to be movable; and a counter structure designed to form a second contact region between the hand-held power tool and the device; wherein the second fastener is designed as a retaining eyelet, the retaining eyelet displaceable axially along a virtual central axis running through the device via a grid.

2. The device as recited in claim 1 wherein the first fastener is designed as a hook to be pushed under the tightening strap of the hand-held power tool.

3. The device as recited in claim 1 wherein the second fastener is designed to be movable along a virtual central axis of the device so that the position of the second fastener is adaptable to a center of gravity of the hand-held power tool.

4. The device as recited in claim 1 wherein the counter structure is designed as a receiving region in order to receive part of the hand-held power tool.

5. The device as recited in claim 4 further comprising an adjuster to adjust a distance between the first fastener and the counter structure designed as the receiving region.

6. The device as recited in claim 5 wherein the adjuster is a knurled screw.

7. The device as recited in claim 1 wherein the counter structure is designed as a retaining ring.

8. The device as recited in claim 7 further comprising an adjuster to adjust a diameter of the counter structure designed as the retaining ring.

9. The device as recited in claim 8 wherein the adjuster is a knurled screw.

10. A method of employing the device as recited in claim 1 for fastening a hand-held power tool to a support structure, the method comprising:

fastening the device via the second fastener to the support structure.

11. A method for fastening a hand-held power tool to a support structure, the method comprising:

a) providing a support structure and a hand-held power tool, b) providing the device as recited in claim 1; and c) connecting the hand-held power tool to the support structure using the second fastener.

12. A device for receiving a hand-held power tool, the hand-held power tool having a first handle and a second handle and the first handle being fastenable with a tightening strap to the hand-held power tool, the device comprising:

a first fastener designed to enter into engagement with the tightening strap and to form a first contact region between the hand-held power tool and the device;

a second fastener, the device being fastenable with the second fastener to a support structure, the second fastener designed to be movable; and a counter structure designed to form a second contact region between the hand-held power tool and the device; wherein the first fastener is designed as a hook to be pushed under the tightening strap of the hand-held power tool.

13. A device for receiving a hand-held power tool, the hand-held power tool having a first handle and a second handle and the first handle being fastenable with a tightening strap to the hand-held power tool, the device comprising:

a first fastener designed to enter into engagement with the tightening strap and to form a first contact region between the hand-held power tool and the device;

a second fastener, the device being fastenable with the second fastener to a support structure, the second fastener designed to be movable;

a counter structure designed to form a second contact region between the hand-held power tool and the device, wherein the counter structure is designed as a retaining ring; and an adjuster to adjust a diameter of the counter structure designed as the retaining ring.

14. The device as recited in claim 13 wherein the adjuster is a knurled screw.

* * * * *